Patented Jan. 12, 1954

UNITED STATES PATENT OFFICE 2,666,083

PROCESS OF PRODUCING α-HALO-ω-TRIHALOPROPYL ETHERS

John W. Copenhaver and Donald E. Sargent, Easton, Pa., assignors to General Aniline & Film Corporation, New York, N. Y., a corporation of Delaware No Drawing. Application November 23, 1948, Serial No. 61,736

7 Claims. (Cl. 260—614)

This invention relates to a novel method wherein a tetrahalomethane is reacted with a vinyl ether in the presence of peroxidic catalysts or ultraviolet light to produce 1-halo-3-trihalopropyl ethers.

We have discovered that when a vinyl ether, preferably containing a small amount of an acetal, and a tetrahalomethane are mixed in the presence of a small amount of an organic peroxide, or when subjected to the influence of ultraviolet light, the halomethane adds on to the double bond of the vinyl ether to produce 1-halo-3-trihalopropyl ether. This reaction may be formulated as follows:

Equation I:

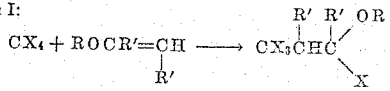

wherein X represents halogen (e. g. chlorine or bromine), the R' represents hydrogen or the same or different alkyl or aryl hydrocarbon radicals, and R represents the hydrocarbon residue of an alcohol or phenol, preferably lower alkyl (i. e. methyl, ethyl, propyl, isobutyl, n-butyl). However, so far as operability of the process is concerned, R may also be higher alkyl (i. e. lauryl, stearyl, etc.), aryl (i. e. phenyl, naphthyl, cresyl, etc.) or alkaryl (i. e. benzyl). The thus obtained 1-halo-3-trihalopropyl ethers are novel compounds which are of interest as chemical intermediates for the production and the synthesis of organic compounds. For example, as described in the copending application of John W. Copenhaver, Serial No. 58,623, filed November 5, 1948, now Patent No. 2,556,905, these tetrahalo ethers may be reacted with an alcohol to produce acetals of trihalo-propionaldehyde, which are of interest as insecticides and as intermediates in the synthesis of insecticidal materials by condensation with chlorobenzene, etc.

The reaction proceeds readily on heating a mixture of a tetrahalomethane and a vinyl ether, the reflux temperature of the mixture and atmospheric pressure having been found to be suitable with vinyl ethers boiling above about 35° C.; with lower boiling ethers pressure is necessary. It has also been found that the yield of tetrahalo ether which is obtained is improved by employing some excess of halomethane in the reaction and in general from 2 to 5 molar proportions of halomethane are employed per mol of vinyl ether.

As examples of vinyl ethers which may be employed in the present invention to produce the corresponding ethers of 1-chloro-3-trichloropropanol may be mentioned the lower alkyl vinyl ethers in which the alkyl group contains from 1 to 5 carbon atoms (i. e. methyl vinyl ether, ethyl vinyl ether, propyl vinyl ether, isopropyl vinyl ether, n-butyl vinyl ether, isobutyl vinyl ether, tertiary butyl vinyl ether, isoamyl vinyl ether, etc.). However, the process is operative with the higher alkyl or cycloalkyl vinyl ethers, such as cyclohexyl vinyl ether, lauryl vinyl ether, stearyl vinyl ether, etc. and if desired, such vinyl ethers as benzyl vinyl ether, phenyl vinyl ether, cresyl vinyl ether, etc. may be employed. In addition to vinyl ethers, related alkyl or aryl α,β-ethylenically unsaturated ethers of the type indicated in the above equation may be employed to produce correspondingly substituted 1,3,3,3-tetrahalopropyl ethers. As examples of such ethers may be mentioned methyl propenyl ether, methyl isopropenyl ether, methyl butenyl ether, methyl-α-phenyl vinyl ether, methyl-β-phenyl vinyl ether and the corresponding ethyl, propyl, butyl, amyl and phenyl ethers and the like.

As stated, the preferred catalyst employed for the reaction is an organic peroxide and it is believed that any organic peroxide which is soluble in the halomethane employed is operative in the present process. As examples of usual and preferred peroxidic catalysts for the present invention may be mentioned benzoyl peroxide, lauroyl peroxide, and the like. Relatively small amounts of catalyst are effective, the amount employed generally being about 0.001% by weight of the vinyl ether. However, amounts up to 0.1% may be employed, if desired. Ultraviolet light also catalyzes this reaction and if desired may be employed as the sole catalyst or along with peroxide catalysts.

It has been found that in addition to the 1:1 adduct which is obtained as illustrated in the Equation I above, there is formed a certain amount of higher boiling material. The production of such higher boiling materials may be formulated as follows:

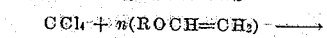

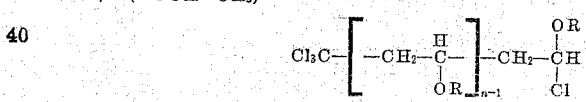

wherein R is as defined above.

It was found that when working with samples of vinyl ethers which had been stored for some time, 80–85% yields of the 1:1 adduct were obtained and only minor amounts of higher boiling materials were produced, while when freshly distilled pure vinyl ethers were employed in the reaction, only 20–40% yields of the 1:1 adduct were obtained and substantially larger amounts of high molecular weight materials were formed. It has been found that small amounts of acetals, which are frequently present in impure or old samples of vinyl ethers, appear to activate the reaction and result in a very substantial increase in the amount of the 1:1 adduct which is formed. Therefore, in the preferred embodiments of this invention, a small amount of an acetal which advantageously should correspond to the vinyl ether employed is included in the reaction mixture. Amounts of acetal equal to from 1–2% of the vinyl ether employed are sufficient. Thus, if butyl vinyl ether is employed in the reaction, preferably from 1–2% of dibutyl acetal is incorporated therein, while if methyl vinyl ether is employed in the reaction, preferably from 1–2% of dimethyl acetal is incorporated therein. The production of the 1:1 adduct as the principal product and the formation of only very minor amounts of higher molecular weight products is a surprising result, in that in most reactions of halo-alkanes with unsaturated compounds, the higher molecular weight products are formed in great amounts as the principal reaction product.

The following specific examples, in which the parts are by weight, will illustrate specific preferred embodiments of the present invention:

Example I 1232 parts by weight (8 moles) of redistilled carbon tetrachloride were heated to reflux and a solution of 0.24 part by weight of benzoyl peroxide in 280 parts by weight (2.8 moles) of n-butyl vinyl ether, which had been stored for several months and contained 1–2% of dibutyl acetal, slowly added thereto during 2 hours. During the addition of the vinyl ether, the temperature of the refluxing reaction mixture gradually increased from 76–92° C. On completion of the addition of the n-butyl vinyl ether, the excess carbon tetrachloride was removed by distillation and the reaction product then distilled under reduced pressure to give 568 parts by weight (approximately 80% of theory) of 1,3,3,3-tetrachloropropylbutyl ether boiling at 80° C./2.0 mm., $n_D^{25}$ 1.4685.

In addition to the tetrachloroether a small amount of higher boiling material was present in the still-pot residue. This higher boiling material was believed to be largely 1,5,5,5-tetrachloro-3-butoxyamyl n-butyl ether and higher molecular weight products of this type. The preponderance of product was, however, the lower molecular weight 1:1 adduct, only traces of the higher molecular weight product being obtained.

Example II 462 parts (3 moles) of carbon tetrachloride, 58 parts (1 mole) of methyl vinyl ether (97% methyl vinyl ether and 1.4% methanol) and 0.09 part (0.0003 mole) of benzoyl peroxide were charged to a pressure vessel and heated slowly to 90° C., at which point a sudden rise in temperature to 106° C. was noted. Heating was continued for about 2 additional hours at about 90° C. and unreacted methyl vinyl ether was then distilled off, recovery of methyl vinyl ether being about 50%. On distillation of the residue there was obtained 51.5 parts (48% of theory, based on vinyl ether recovered) of methyl 1,3,3,3-tetrachloropropyl ether (boiling point 70–71° C. at 13 mm.); $n_D^{25}$ 1.4744–1.4752.

Example III 462 parts (3 moles) of redistilled carbon tetrachloride were heated to the reflux temperature of 77° C. in a transparent quartz flask. The solution was then irradiated with ultraviolet light (Mazda A–H–5; distance of flask to light about 10 cm.) and with continued irradiation, heating and stirring at the reflux temperature, there were added, in the course of 4 hours, 100 parts (1 mole) of n-butyl vinyl ether. The solution was heated for an additional 8 hours with continued irradiation at the reflux temperature. The excess carbon tetrachloride was removed and the concentrate was distilled at reduced pressure to give 1,3,3,3-tetrachloropropyl butyl ether (boiling point 77° at 1.4 mm.).

It will be understood that the foregoing examples are illustrative of preferred embodiments of the present invention and that various modifications of the type previously indicated may be made therein without departing from the spirit of this invention or the scope of the appended claims. It will also be apparent that in place of the carbon tetrachloride specified in the foregoing examples, other tetrahalomethanes such as carbon tetrabromide, trichlorobromomethane, dichlorodibromomethane or tribromochloromethane may be employed. In the event that mixed halomethanes are employed in the reaction, the product obtained will presumably be a 1-bromo-3,3,3-trihalo compound, although the possibility that an isomeric 3-bromo-1,3,3-trihalo compound may be formed is not precluded.

We claim:

1. The process of producing ethers of 1-halo-3-trihalopropyl ethers, which comprises subjecting a mixture of a vinyl ether selected from the group consisting of alkyl-, aryl and alkaryl vinyl ethers with a tetrahalo methane, said mixture being substantially free of polymerizable compounds other than the vinyl ether specified; to the action of heat and in the presence of free radicals selected from the class consisting of free radicals formed by peroxy compounds acting on the reaction mixture and free radicals formed by ultraviolet light acting on the reaction mixture.

2. The process as defined in claim 1, wherein the vinyl ether contains a small amount of an acetal selected from a group consisting of dialkyl-, aryl- and alkaryl-acetals in which the alkyl, aryl and alkaryl groups correspond to the similar groups in the vinyl ether employed.

3. The process as defined in claim 1, wherein the halo-methane is carbon tetrachloride.

4. The process as defined in claim 3, wherein the vinyl ether is a lower alkyl vinyl ether.

5. The process as defined in claim 4, wherein the vinyl ether contains a small amount of a lower alkyl acetal the alkyl group which corresponds to the alkyl group of the vinyl ether.

6. The process as defined in claim 3, wherein the reaction is effected in the presence of benzoyl peroxide.

7. The process as defined in claim 6, wherein the vinyl ether contains a small amount of a lower alkyl acetal the alkyl group which corresponds to the alkyl group of the vinyl ether.

JOHN W. COPENHAVER.
DONALD E. SARGENT.

References Cited in the file of this patent

UNITED STATES PATENTS

| Number | Name | Date |
|---|---|---|
| 2,423,497 | Harmon | July 4, 1947 |
| 2,440,800 | Hanford | May 4, 1948 |
| 2,561,516 | Ladd et al. | July 24, 1951 |
| 2,568,859 | Ladd et al. | Sept. 25, 1951 |

OTHER REFERENCES

Post: "Jour. Org. Chem.," vol. 6, pages 833, 834 (1941).

Beilstein: "Handbuch der Organ. Chemie.," vol. 1, 4th edition, page 623 (1944).